US009426289B2

(12) United States Patent
Shaffer et al.

(10) Patent No.: US 9,426,289 B2
(45) Date of Patent: Aug. 23, 2016

(54) TECHNIQUES FOR TOPICAL CUSTOMER SERVICE MENU RECONFIGURATION BASED ON SOCIAL MEDIA

(71) Applicant: Avaya Inc., Basking Ridge, NJ (US)

(72) Inventors: Shmuel Shaffer, Palo Alto, CA (US); Reinhard P. Klemm, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 125 days.

(21) Appl. No.: 14/024,674

(22) Filed: Sep. 12, 2013

(65) Prior Publication Data

US 2015/0071418 A1 Mar. 12, 2015

(51) Int. Cl.
*H04M 3/493* (2006.01)
*G06Q 50/00* (2012.01)
*G06Q 30/02* (2012.01)
*H04M 3/51* (2006.01)

(52) U.S. Cl.
CPC ............... *H04M 3/493* (2013.01); *G06Q 30/02* (2013.01); *G06Q 50/01* (2013.01); *H04M 3/5166* (2013.01); *H04M 3/5191* (2013.01); *H04M 2203/655* (2013.01)

(58) Field of Classification Search
CPC ................................................ H04M 2203/405
USPC ........ 379/88.01, 88.17, 88.18, 265.01–266.1, 379/88.13, 265.02; 705/35; 709/206
See application file for complete search history.

(56) References Cited

U.S. PATENT DOCUMENTS

| 7,747,493 | B1 * | 6/2010 | Monroe | 705/35 |
| 2005/0074113 | A1 * | 4/2005 | Mathew | G06Q 10/06 379/265.02 |
| 2012/0051526 | A1 * | 3/2012 | Erhart et al. | 379/88.18 |

* cited by examiner

*Primary Examiner* — Md S Elahee

(57) ABSTRACT

Techniques for topical customer service menu reconfiguration based on social media are claimed. In one embodiment, for example, an apparatus may comprise a social media gateway and an adjustment component. The social media gateway may be operative to receive social media information from one or more social media networks. The adjustment component may be operative to data mine the social media information to extract one or more characteristics, infer a trend from the extracted one or more characteristics, and adjust a customer service menu tree based upon the inferred trend. Other embodiments are described and claimed.

20 Claims, 8 Drawing Sheets

400

Receive social media information from one or more social media networks.
402

Data mine the social media information to extract one or more characteristics.
404

Infer a trend from the extracted one or more characteristics.
406

Adjust an interactive voice response (IVR) tree based upon the inferred trend.
408

*FIG. 4*

TECHNIQUES FOR TOPICAL CUSTOMER SERVICE MENU RECONFIGURATION BASED ON SOCIAL MEDIA

BACKGROUND

Contact centers generally exchange information with consumers through directed contacts. Directed contacts consist of emails, phone calls, or other forms of communication that are directed to the contact center or the consumer. However, many people today exchange information or interact through non-direct methods. Non-direct communications require users to post communications to third party sites or forums, but not to direct those communications to a specific person. Often, these forums are hosted by a specific organization and the discussions revolve around this organization and are also directed to the organization. For example, Twitter™ feeds from a company, Facebook™ business pages, etc. Non-direct communication methods include social media, which may include websites, networks, blogs, micro-blogs, RSS feeds, social media websites (such as, Linked-In™, Facebook™, Twitter™, MySpace™, etc.), and other types of social media.

Consumers are finding it useful to ask their questions, complain about service, and complement companies in the public forum of social media. Social media is often a "canary in a coal mine" (i.e., an early indicator) for possible service-affecting events because social media users typically express themselves on social media channels before using traditional channels like voice. The addition of social media to valid contact center channels increases the overall coverage required by today's contact center. However, contact centers have limited amounts of resources. The burden of keeping other, traditionally static, contact center self-service channels current, efficient, and useful becomes a difficult problem. Therefore, traditional contact centers do not react to trends in social media that duplicate trends from other channels so as to have refreshed, topical menus available to customers on customer service menu systems, like voice dialog via interactive voice response ("IVR"). Delays in addressing a customer crisis results in lost time, money and reputation for a business.

It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for topical Interactive Voice Response (IVR) reconfiguration based on social media. However, the present invention is not limited to IVR menu reconfigurations. Rather, it is within the scope of the present invention to include embodiments for improvements to any and all topical customer service menu reconfigurations. For clarity purposes, this disclosure describes embodiments of the present invention in terms of an IVR system but it should be understood by one of ordinary skill in the art that the present invention also contemplates other customer service menu systems. For example, if a contact center offers a Web app (e.g., HTML5 user interface to the contact center) that allows a customer to navigate a customer service menu online, that type of menu can be reconfigured just like an IVR system.

Embodiments are particularly directed to techniques for reconfiguring consumer service menu systems, e.g., IVR systems, based on social media wherein topic priority and the available options are adjusted in response to trending social media information. In one embodiment, for example, an apparatus may comprise a social media gateway and an adjustment component. The social media gateway may be operative to receive social media information from one or more social media networks. The adjustment component may be operative to data mine the social media information to extract one or more characteristics, infer a trend from the extracted one or more characteristics, and adjust an interactive voice response (IVR) tree based upon the inferred trend. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 4 illustrates an embodiment of a logic flow for the system of FIG. 1.

DETAILED DESCRIPTION

Figure 1:
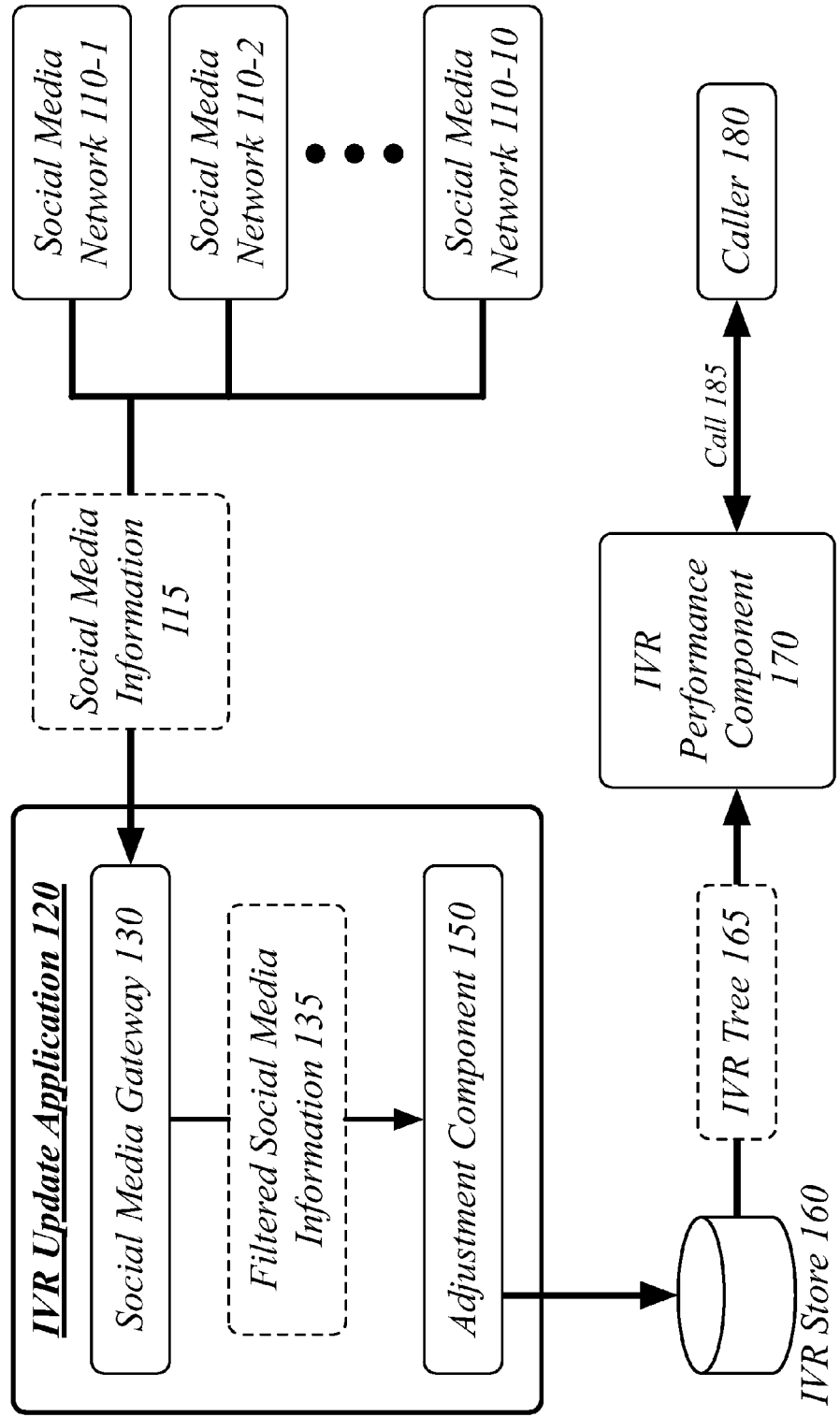
FIG. 1 illustrates an embodiment of a system for topical IVR reorganization based on social media.

Various embodiments are directed to techniques for topical IVR reconfiguration based on social media. Social media channels are gaining momentum as a platform for delivering and receiving customer support. Consumers are finding it useful to ask their questions, complain about service, and complement companies in the public forum of social media. The addition of social media to valid contact center channels increases the overall convergence required by today's contact center. The burden of keeping other, traditionally static, contact center self service channels current, efficient, and useful becomes a difficult problem.

Customers who call into a contact center to directly speak to a contact center agent or to use the phone for self service benefit from efficient interactive voice response ("IVR") systems that make the most common menu choices and options easy to find and simple to navigate. This becomes very difficult when deploying a static system with many options and many levels of menus. Furthermore, the need may arise to move menu items around based on time of day, current events, or trending problems. These IVR systems may be paired with or make use of an automated speech recognition (ASR) system for receiving and processing voice communication.

Embodiments in accordance with the present invention are able to monitor and gather social media data items (e.g., Tweets, Facebook posts, blog entries, etc.). The social media data items are processed by recognizing information, extracting information and/or categorizing information. The processed information is then imported into the contact center as work items to be further processed and/or analyzed by automated agents or by live agents. The resulting analyzed social media data has many applications as a dynamic data source.

Social media monitoring and analysis is used to detect trending topics, sentiment spikes, and other events interesting to an enterprise contact center. An example of an event interesting to a contact center is a natural disaster or accident that affects a small geographic area and is reported by social media users and may cause a surge in incoming calls to the enterprise contact center (an insurance, home improvement store, construction company, or similar). With this information, the invention dynamically adjusts IVR grammars, call flows, and prompts for callers during the duration of the detected event. Adjustments may also include changing weights associated with potential matches to items in a lexicon, adding items to the lexicon, and/or deleting items from the lexicon.

Public social sources may include the following: Twitter™, Facebook™, LinkedIn™, YouTube™, Blogs, RSS, search sites (Google™, Bing™, etc.), etc. Any site where users may post information about themselves or comment about current events and make that information available for social networking purposes may be used as a source of social information.

Embodiments in accordance with the present invention include a continuously running social media monitoring system that looks for characteristics such as trends, new topics, business-relevant events, and sentimental spikes. This system will monitor all sites configured and if triggered, will produce a "notification interaction", prompting a potential action by the IVR/ASR systems. Interactions are monitored and processed in real-time, producing up to the minute analysis of the state of the configured topics. Furthermore, any unknown topic, sentiment, event, or trend items are noted and produce similar notifications. The analysis may include a combination of standard methods in cloud based services and internal created analysis of characteristics including text processing, part of speech analysis, language identification, classification methods, location-based information, time-based information, etc.

Topics may be configured depending upon the monitored social media channels. For example, in Twitter the social media gateway may be configured by an administrator to search for a set of terms, e.g., an airline might put in their airline name, initials (Delta™, DL), and terms like "flight", "ticket", "plane", "tarmac", etc. A social media gateway may allow a user to establish a context of when those words are relevant and when they are not relevant. To illustrate, "Delta" may also be associated with Delta Faucets™, a college fraternity or sorority, a river delta, and so forth. The context of a potentially ambiguous search term like "Delta" is establish by selecting a set of related terms that must appear with a search term before a hit of the search term is considered to be relevant. For example, for the search term "Delta," the system may be configured to search for related terms like "airline", "flight", "ticket" in context with "Delta" to distinguish tweets on airline topics from other topic domains.

An SMM may also have an ability to receive @mention and direct message type tweets. An @mention is a type of tweet that contain text such as "@<twitterhandle>," where the <twitterhandle> is the name of another user on twitter. For example, Delta Airlines may establish a twitter handle "DeltaAssist" to allow customers to communicate with Delta social media associates. Direct message tweets are a non-public person-to-person communications channel that Twitter supports for users that are followers of each other. For both @mention and direct message tweets, the social media message is specifically addressed to the company, so topic configuration should not be necessary because such tweets are assumed to be "on-topic." For other social media channels (e.g., Facebook, Linked-In), the company may establish a "page" as an anchor point for conversations. The content of the conversations on that page are assumed to be on the topics related to the company because, e.g., one typically would not post a message about Delta Faucets on the Delta Airlines Facebook page. Spam filters may also be useful in ensuring that posts are on-topic.

The notification interactions are configured to trigger action by the contact center IVR/ASR systems. The action may include an initial reconfiguration, as described herein, of the IVR/ASR systems, and/or provisioning a duration of the reconfiguration, and/or provisioning that the reconfiguration is intended to be of indefinite duration, and/or the notifying a user of unforeseen triggers or states. For example, a power outage event may be designed or set up to trigger an action that will last until the action is manually reset. In another example, a generic service disruption may have a duration of, e.g., 60 minutes after an end of a trend is detected, or 60 minutes after a sentiment spike has returned to normal levels.

An aspect of the invention is the handling of unknown events, such as unanticipated critical service events that may occur. Monitoring social channels may provide notification of these events before traditional incoming channel calls are affected by these critical service events. Critical service events may trigger certain actions. First, the IVR/ASR system may be notified of an unknown service event, triggering some default processing in response. Second, a notification trigger may be sent to notify an appropriate workflow chain to analyze and deal with the new event. This may include manual changes to the IVR/ASR systems, both in monitoring and in the contact center.

For example, if a weather event or natural disaster occurs (e.g., a tornado outbreak; an earthquake; a volcanic ash eruption, etc.), there may be unanticipated travel disruption throughout a region. Early notification through social channels would provide early warning of an increased call volume to come.

Once an IVR/ASR system has received the notification information, the system may dynamically adjust its user interface, by adding/deleting/changing available options, menus, prompts, grammar processing, workflow (i.e., the sequence in which a work item is handled in a contact center), or adding/deleting entries in an ASR lexicon, etc., in order to accommodate the events as detected from the changing social state, i.e., from changes in social information posted on social networking sites. For example, the notifications may affect a single prompt, may cause a change in order of individual menu items within a list, may cause new menu item to be added to accommodate the new event, and so forth. In addition, the system may be configured to activate an entire dialog module that replaces or augments large parts of the response/routing system. In another embodiment in accordance with the present invention, only back end routing parameters are changed with no difference visible to the caller. Back end routing parameters may refer to data that a work flow engine or underlying call routing/handling switch may use to make an assignment of a call to a specific resource (e.g., contact center agent, IVR, etc.) within a contact center. For example, a trend might place callers with "volcano" issues into a different queue than they might have gone into based on their CRM demographic. Work flows use data to make routing determinations, and the data used for those routing decisions may be modified by an identified trend.

As a result, the embodiments can improve the performance of an IVR system and improve the affordability of updating the IVR system in response to recent events.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for an interactive voice response (IVR) system 100. In one embodiment, the IVR system 100 may comprise a computer-implemented IVR system 100 having a IVR update application 120 comprising one or more components. Although the IVR system 100 shown in FIG. 1 has a limited number of elements in a certain topology, it may be appreciated that the IVR system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-a may include components 122-1, 122-2, 122-3, 122-4 and 122-5. The embodiments are not limited in this context.

The IVR system 100 may comprise the IVR update application 120. The IVR update application 120 may be generally arranged to receive social networking information 75 from a plurality of social media networks 110-a and adjust an IVR tree 165 based on the received social media information 115. The IVR system 100 may be used as part of a contact center.

A contact center can be a system that can communicate with one or more persons that use social media networks 110-a. The contact center can be hardware, software, or a combination of hardware and software. The contact center can be executed by one or more servers or computer systems. The contact center can include all systems, whether hardware or software, that allow the contact center to receive, service, and respond to directed and non-directed contacts. For example the contact center can include the telephone or email system, an interface to human agents, systems to allow human agents to service and respond to received contacts, and one or more systems operable to analyze and improve the function of agent interaction.

The contact center may also communicate with one or more communication devices. Communication devices may be a customer's or user's cell phone, email system, personal digital assistant, laptop computer, or other device that allows the contact center to interact with the customer. The contact center can modify a non-direct contact, from a social media networks 110-a, into a directed contact by sending a response message directly to a customer's communication device.

Social media networks 110-a can be any social media including, but not limited to, networks, websites, or computer enabled systems. For example, a social media network may be MySpace, Facebook, Twitter, Linked-In, Spoke, or other similar computer enabled systems or websites.

The IVR system 100 may comprise an IVR performance component 170. The IVR performance component 170 may be generally arranged to perform a dialog for the IVR system 100 when in communication with various contacts, such as caller 180 via call 185. For example, IVR performance component 170 may receive an incoming call 185 from caller 180, answer the call 185, and perform an IVR tree 165 comprising various dialogs, prompts, options, and commands.

The IVR tree 165 may comprise a structured, hierarchical set of dialogs, prompts, options, and commands for use with contacts. The IVR tree 165 may comprise a top level dialog performed in response to the reception of an incoming call. The top-level dialog may comprise a plurality of options for selection by a user. Each option of the plurality of options may comprise a segment of text spoken to a caller 180 with an associated command that the caller 180 may use to select the option. A command may comprise a word or phrase that the caller 180 may speak, a number that the caller 180 may speak, a number that the caller 180 may enter using a telephone keypad, or any other known technique for indicating a command using a telephone or other voice-communication device. It will be appreciated that speaking a segment of text may involve using a text-to-voice routine or playing a recording of a human being reading the text.

A command received in the performance of the IVR tree 165 may initiate an action by the IVR system 100. The IVR system 100 may retrieve and communicate one or more pieces of information to a caller 180 in response to a received command. The IVR system 100 may update, create, modify, delete, or otherwise modify a stored piece of information—such as a merchandise order, a request, or any other information—in response to a receive command. In addition or alternatively, the IVR system 100 may move to a lower level of the IVR tree 165 in response to the received command. For example, one option of the plurality of options may comprise a request to receive information about whether an item is stock at a store. A lower level of the IVR tree 165 may comprise various items that the IVR system 100 allows a caller 180 to learn more about. In general, the IVR tree 165 may comprise various branching dialogs in which upon selection of an option a new set of options is presented to the user. It will be appreciated that while the IVR tree 165 is described as a tree structure, that different selections of options, such as the selection of multiple options in sequence via various dialogs, may lead to a same part of the IVR tree 165. The IVR tree 165 may be stored in an IVR store 160.

The IVR update application 120 may comprise a social media gateway 130. The social media gateway 130 may be generally arranged to receive social media information 115 from one or more social media networks 110-a. Social media information may correspond to any information gathered from the one or more social media networks via one or more social media APIs for interfacing with social media networks 110-a.

The social media gateway 130 may be generally arranged to filter the social media information 115 to produce filtered social media information 135. Filtered social media information 135 may comprise the portion of social media information 115 determined to be relevant to the contact center associated with IVR system 100. Filtered social media information 135 may comprise additional data generated in the analysis of social media information 115 which may be useful to adjustment component 150 in its adjustment of IVR tree 165.

The IVR update application 120 may comprise an adjustment component 150. The adjustment component 150 may be generally arranged to receive filtered social media information 135 from the social media gateway 130 and use the filtered social media information 135 to adjust an IVR tree 165.

Adjusting the IVR tree 165 may comprise moving a first option of a plurality of options from a later spot to an earlier spot in the IVR tree 165 based upon the inferred trend indicating an increased importance of a topic related to the first option. For example, the first option may relate to purchasing gas-powered generators. The inferred trend may be an increasing prominence of social media users discussing losing power due to a serious storm. This trend an increased importance of home power generation. As such, this first option may be moved from a later spot in the IVR tree 165 to an earlier spot.

The earlier spot being earlier than the later spot may comprise the earlier spot coming before the later spot in a sequence of options performed by the IVR performance component 170. The earlier spot and later spot may be at the same level in the hierarchy of the IVR tree 165, such as a top-level or a level reached after the selection of one or more options by the caller 180. Alternatively, the earlier and later spot may be at different levels in the hierarchy of the IVR tree 165 such that the first option is moved across levels in the hierarchy.

Recognizing trending topics based upon data mining of social media channels may include attempting to estimate persistence of the recognized words and phrases. For example, low-persistence words and phrases such as those related to a transient and low-recurring event or phenomenon (e.g., weather event, earthquake, volcanic ash, etc.) may be expected to occur less frequently as the transient phenomenon changes from being a present event to being a historical event. However, high-persistence words and phrases such as those related to a non-transient or permanent (e.g., renaming of an airport) or high-recurring event (e.g., traffic jams, etc.) that may be expected to be encountered in the future, even if presently the frequency of usage of those words and phrases may decline below a predetermined threshold, or even if a certain amount of time has passed.

In some embodiments, the adjustment component 150 may estimate a persistence of the inferred trend and determine a limited duration of the adjustment to the IVR tree based on the estimated persistence. For example, a low-persistence trend may use a first predetermined duration and a high-persistence trend may use a second, longer predetermined duration. However, more granular durations may also be used. For example, the adjustment component 150 may categorize various trends into various buckets wherein each bucket is associated with a particular expected persistence and is associated with a particular limited duration.

In some embodiments, the IVR tree 165 may be reverted to its original configuration once an inferred trend has subsided. For example, a trend indicating higher interest in home power generation may subside below a threshold, such as after power is restored to a significant number of homes following a storm, and an option related to the purchase of gas-powered generators reverted to its previous position in the IVR tree 165 in response. The social media gateway 130 may receive additional social media information from the one or more social media networks 110-a and determine additional filtered social media information, which it forwards to the adjustment component 150. The adjustment component 150 may in response data mine the social media information to extract one or more additional characteristics, infer a second trend from the extracted one or more additional characteristics, and return the first option of the plurality of options to the later spot based upon the inferred second trend indicating a decreased importance of the topic related to the first option.

In addition to moving options, the adjustment component 150 may be operative to create a new option in the plurality of options based upon the inferred trend indicating an increased importance of a topic related to the new option. For example, the IVR tree 165 may not have a specific option for checking the availability of gas-powered generators. The adjustment component 150 may be operative to initiate the creation of such an option in response to a determination of a related trend, such as one indicating increased interest in home power generation.

In some embodiments, the adjustment component 150 may automatically and programmatically create the new option and insert into the IVR tree 165. The adjustment component 150 may be operative to insert the new option in a prominent position in the IVR tree 165, such as the first option at the highest-level of the IVR tree 165 or as one of the earliest options in the highest-level of the IVR tree 165. Similar to with moved options, the adjustment component 150 may be operative to remove the new option after a determined limited duration or in response to a determination that the inferred trend has subsided.

In some embodiments, creating a new option in the IVR tree 165 may comprise retrieving an inactive option from the IVR store 160. The IVR store 160 may contain a plurality of inactive options that were previously active or that were created in anticipation that they might be needed. For example, if the adjustment component 150 is operative to recognize that home power generation is trending in importance the IVR store 160 may be configured with an option for determining the availability of gas-powered generators. In general, the various topics, which the adjustment component 150 may be operative to recognize an increasing importance of, may each be associated with an option, either an existing option to increase in priority or an inactive option to promote to active status.

In some embodiments, the adjustment component 150 may involve a human operator in the creation of the new option, such as where original text needs to be created or where human judgment is otherwise relevant. The adjustment component 150 may alert a maintainer of the IVR tree 165 of an increased importance of a topic, receiving a new option for the plurality of options from the maintainer of the IVR tree, and insert the new option into the plurality of options. The new option may be associated with a limited duration. In various embodiments the adjustment component 150 may propose the limited duration to the human operator or may receive the limited duration from the human operator. In various embodiments the adjustment component 150 may automatically remove the new option in response to a determination that the trend has subsided or may alert the maintainer that the trend has subsided and only remove the new option in response to a maintainer command to remove the option or to approve the removal of the option.

In various embodiments the new option from a human operator may comprise an option created specifically in response to the IVR system 100 prompting the human operator, or may comprise the IVR system 100 activating an inactive option from the IVR store 160. In some embodiments, the adjustment component 150 may specifically propose that an inactive option be activated. If a new option is specifically created by a human operator in response to the alert by the adjustment component 150, the adjustment component 150 may be operative to set the new option as inactive and retain it in the IVR store 160. If the topic becomes important again, the adjustment component 150 may be operative to suggest the new inactive option to a human operator or to automatically activate the new inactive option in response to the topic increasing in importance. As such, the IVR store 160 may accumulate additional options over time increasing its ability to automatically responding to trending topics, only requesting the intervention of a human operator when a trending topic does not have a default behavior (e.g. activating an inactive topic) associated with it.

In some embodiments, a new queue may be made in a contact center for the new option. For example, various options may lead to entering a caller 180 into a queue for contact with a human operator. A contact center may have multiple queues for various categories of action. Where the new option corresponds to a new action a new queue may be added to the multiple of queues. In some cases, a trending topic may be sufficiently important to warrant a new queue even where the new option would previously have been handled by an existing queue. For example, where demand for gas-powered generators is predicted to be sufficiently high, a new queue dedicated entirely to checking availability of and receiving orders for gas-powered generators may be created in the call center so as to allow for call center staff to be dedicated to that one task, to allow for that task to be at a higher or lower priority than other tasks, or for any other reason.

Figure 2A:
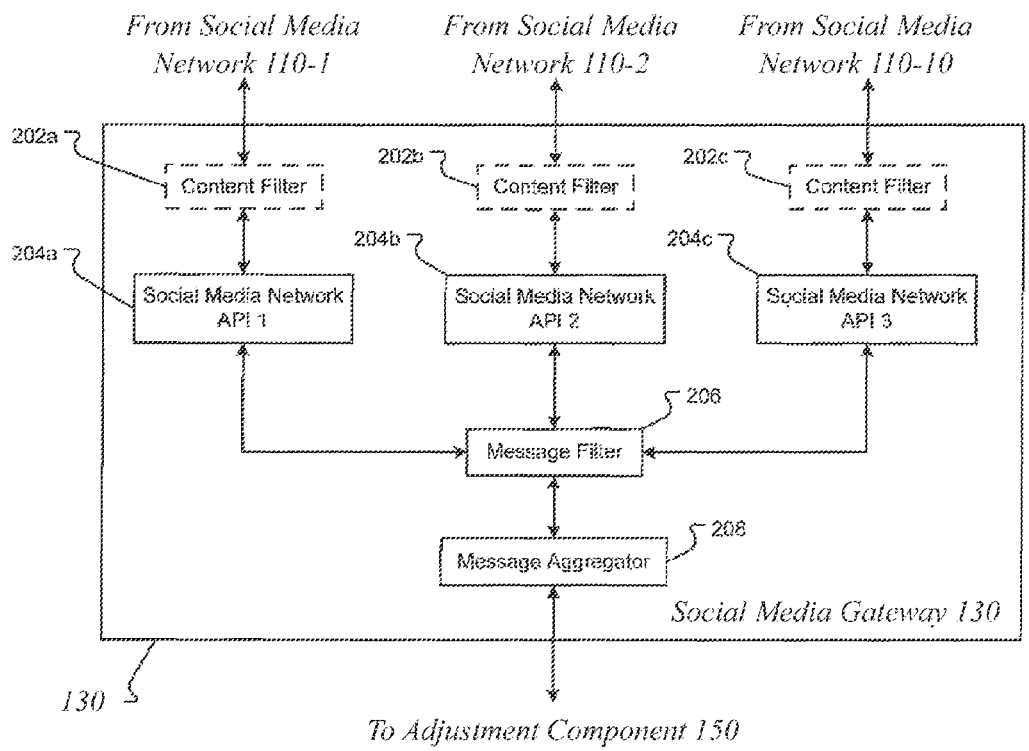
FIG. 2A illustrates an embodiment of a social media gateway.

FIG. 2A illustrates an embodiment of a social media gateway 130 for the IVR system 100.

Herein, the social media gateway 130 can include one or more content filters 202*a*, 202*b*, and/or 202*c*. A content filter 202 can receive all of the messages for the contact center from social media networks 110-*a* and eliminate or delete those messages that do not require a response. For example, a message between two friends on a Facebook page, if not pertaining to a product or a service of the company operating the contact center, may not need a response. As such, the content filter 202 can filter out or delete the non-suitable message from the messages that are received by the social media network application programming interface (API) 1 204*a*, social media network API 2 204*b*, and/or social media network API 3 204*c*. With the content filter 202, the social media network API 204 only needs to translate those messages that should be received by the adjustment component 150. Translation typically requires the conversion of the message into a different format.

The content filter 202 is provided with one or more heuristics for filter rules from a filter database (not shown). These filter rules can be created by the external customer or internal user (e.g. agent or administrator) of the IVR system 100. Thus, the user or customer of the IVR system 100 can customize the filtering of messages from social media networks 110-*a*. Further, different rules may be applied to different social media networks 110-*a*, as some social media networks 110-*a* may have different types of messages or postings than other types of social media networks 110-*a*. While the content filter 202 is shown as part of the social media gateway 130, it is to be appreciated that the content filter 202 may be a part of the social media network API 204. The content filter 202 may correspond to query terms used by the social media network API 204. The content filter 202 or query terms are an argument to the social media network API 204 call.

The social media network API 204 can be an application that the social media networks 110-*a* provides to access the social media networks 110-*a*. Thus, the social media network API 204 is called and connects the social media gateway 130 to the social media networks 110-*a*. Any suitable filter criteria may be employed for social media API 204. Examples of filter criteria include positive content of positive the source of posting, an address field, destination or recipient address fields, a time stamp field, a subject matter field, and a message body field. For example, a type of searchable content can be name of the business enterprise running or employing the contact center and/or the products or services of the enterprise.

The social media gateway 130 can include one or more social media network APIs 204. As shown in FIG. 2A, the social media gateway 130 may include a social media network API 204 for each social media networks 110-*a*. As such, the social media gateway 130 can interact with each social media networks 110-*a* in the particular (often unique) format or protocol used by the social media networks 110-*a*. Further, when new social media networks are created, the social media gateway 130 can be easily expanded to interact with those social media networks by adding another social media network API 204. Where social media networks 110-*a* are more standardized, or use substantially similar formats or protocols, a single social media network API 204 can be shared by multiple social media networks 110-*a*.

The social media network API 204 can receive messages from and send messages to the social media networks 110-*a*. The social media network API 204 can translate a message received from a social media networks 110-*a* and send the translated message to a message filter 206. The social media network API 204 can translate the received message into a standard formatted file. For example, the translated message may be represented by an extensible mark-up language (XML) file or other file having a general format. As such, each specific and particular social media network message can be translated into a standard format for use by the adjustment component 150. Further, the social media network API 204 can receive a generally or standard format response message, from the adjustment component 150, and translate that response into a particularly or specifically formatted response message that can be posted to the corresponding social media networks 110-*a*.

Messages to the contact center are addressed to the contact center. For example, a customer may become a "friend" of the contact center on a social media network 110-2, such as Facebook. The customer may then address a message to the contact center on Facebook. This non-direct contact is a message that is not sent directly to the contact center but to the contact center's Facebook page. In other embodiments, the contact center receives messages not addressed to the contact center. For example, the contact center can receive tweets from Twitter that are "broadcast" rather than addressed to the contact center. The contact center may also search for messages or content on the social media networks 110-*a*. Exemplary search criteria include customer name, customer profession, customer home address, customer business address, customer employer name, customer educational or professional background, customer hobby, personal or business interests, customer family profile, and the like. Thus, the social media gateway 130 of the contact center can query, gather, or connect to a live feed of data from social media networks 110-*a* and then apply a filter to the indirect information.

Further, the social media network API 204 can also retrieve user context or other extended information from the social media networks 110-*a*. User context or other extended information can include historical posts, historical tweets, or other historical communications that a user may have received or sent. Further, user context or other extended information can include, but is not limited to, account information for a user, the user's followers or friends, information on where historical messages were posted (e.g., geo-location, time/date, what type of device, etc.), trending analysis that the social media networks 110-*a* might provide the user, etc. Thus, the social media network API 204 can retrieve information that is associated with a user and social media networks 110-*a* but not necessarily a part of a current message. The social media network API 204 is a gatherer of data, which can be used to determine a value for the user of the social media networks 110-*a*.

The translated messages from the social media network API 204 can be received by a message filter 206. A message filter 206 can perform some or all of the functions of the content filter 202 and eliminate messages before being sent to the adjustment component 150. However, in other embodiments, the message filter 206 eliminates information from within the messages before the redacted messages are sent to the adjustment component 150. For example, a message from a social media network 110-1 may have three or four interactions between two parties not associated with the contact center. Only one of the several postings may be pertinent to the adjustment component 150. As such, the message filter 206 can eliminate or delete at least a portion of the other messages for the adjustment component 150. Thus, the adjustment component 150 receives a message where some of the content of the message has been deleted. The message filter 206 can retrieve heuristics or filter rules from a filter database (not shown), similar to the content filter 202. A substantial difference between the content and message filters 202 and 206 is that the content filter 202 is specific to a particular message format associated with a corresponding social media networks 110-*a*, while the message filter 206 is applied to a standardized or universal format and is therefore common to multiple social media networks 110-*a*. One skilled in the art will understand the type of rules that may be used to filter information from messages such that only pertinent questions, facts, requests, or information is sent to the adjustment component 150.

A message aggregator 208 may also be included with the social media gateway 130. A message aggregator 208 can, in contrast to the message filter 206, combine two or more messages into a packet or grouping that is sent to the adjustment component 150. Therefore, the message aggregator 208 can interrelate or combine messages based on information within the messages. For example, two messages may be combined based on any of the message fields referenced above, such as the person that posted the message, the subject, the request or question asked, the person the message was sent to, or other information that may be pertinent to the adjustment component 150. Thus, the adjustment component 150 may be able to respond concurrently to two or more messages based on a grouping provided by the message aggregator 208. Regardless of whether the messages are aggregated, each message or grouping of messages can be sent from the social media gateway 130 to the adjustment component 150.

The social media gateway 130 can also send responses back to the social media networks 110-*a*. A response from an agent in the contact center can be sent to the social media gateway 130. The response may be in a general format and translated. The translated response may then be posted to the appropriate social media networks 110-*a* by the social media gateway 130. In other embodiments, the agent may post the response directly to the social media networks 110-*a* without sending the response to the social media gateway 130.

Figure 2B:
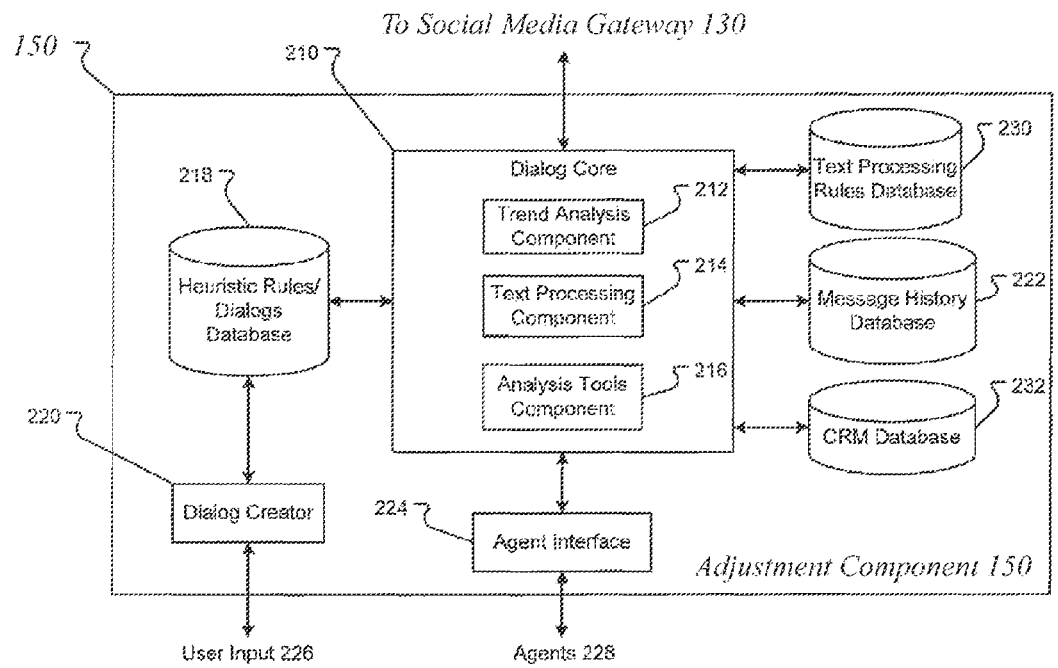
FIG. 2B illustrates an embodiment of an adjustment component.

FIG. 2B illustrates an embodiment of an adjustment component 150 for the IVR system 100.

The adjustment component 150 can include one or more components which may be hardware, software, or a combination of hardware and software. The adjustment component 150 can be executed by a computer system. However, in other embodiments, the components described in conjunction with FIG. 2B, are logic circuits or other specially-designed hardware that are embodied in a FPGA or ASIC. The components contained within the adjustment component 150 can include a dialog core 210 that is communication with a message history database 222, an agent interface 224, and a heuristic rules and dialogs database 218. Further, the heuristic rules and dialogs database 218 can be in communication with a dialog creator 220. The heuristic rules and dialogs database 218 may generally correspond to the IVR store 160 described with reference to FIG. 1.

The dialog core 210 can include one or more sub-components. For example, the dialog core 210 can include a trend analysis component 212, a text processing component 214, and an analysis tools component 216. These components, similar to the components for the adjustment component 150, can be hardware, software, or combination of hardware and software. The dialog core 210 may step through the states of a dialog data structure. A dialog data structure can include a set of inputs and associated actions that can be taken which allow for the automatic and structured response to social media requests or messages. For example, if a user asks for a manual, the input of the text word "manual" can cause the adjustment component 150 in accordance with a dialog data structure, to send information about one or more manuals. In turn, the receiver of the response may respond, in kind, with the selection of a certain user manual. In which case, the dialog data structure may then instruct the dialog core to send the user to a website where the user can retrieve an electronic version of the manual. As such, the dialog data structure provides a script a dialog that allows the dialog core 210 to automate the interaction between the contact center and a person. This automation eliminates the need for agent involvement, in some situations, and makes the contact center more efficient and more effective. Further, the automation expands the contact center's ability to answer numerous messages from the plethora of postings on the numerous social media networks 110-*a*.

The dialog creator 220 will create a dialog data structure 300 that includes instructions for various states for each social media message that comes into the contact center. The first instruction might be to send the social media message to the trend analysis component 212, then to the text processing component 214, and then execute a query of a Customer Relationship Management ("CRM") database 232 (to determine if this user has an existing order). A CRM database 232 can store information about customers or other data related to customer relations. Finally the dialog data structure 220 might decide that the social media message should be sent to a human agent 228 for processing. The instructions or node transitions are executed in the dialog core 210 and make use of many different components that the dialog creator 220 combines in any way the user desires to handle the social media messages. The dialog core 210 can make use of the trend analysis component 212, text processing component 214, or other systems. The dialog core 210 may also interface with a CRM system and/or database 232, external databases, social media user information (e.g., followers, friends, post history, etc. from the social media site), or other systems.

The trend analysis component 212 is operable to analyze trends that occur between two or more messages received by the social media networks 110-*a*. The two messages can be from different social media networks, so that the trend analysis component 212 can identify trends across several different social media networks 110-*a*. Trends can include multiple occurrences of the same word or phrase, multiple occurrences of a customer identity, product name or service, or multiple occurrences of some other information that might indicate a trend. Further, the trend analysis component 212 may be able to identify escalations in the occurrences of particular text, identities, or other information, or may identify multiple occurrences over a period of time. The trend analysis component 212 may also be able to apply one or more different algorithms to occurrences of information within the social media networks 110-a. For example, the trend analysis component 212 can match the number of occurrences of a phrase or word over a period of time and apply analysis to determine if the occurrences are increasing or decreasing over the period of time.

The text processing component 214 is operable to analyze text of one or more messages from social media networks 110-a. Some possible methods for text processing can include Regular Expression, Latent Semantic Indexing (LSI), text part of speech tagging, text clustering, N-Gram document analysis, etc. The text processing rules or models may be stored in and/or retrieved from a text processing rules database 230.

The text processing component 214 can identify one or more occurrences of a particular text, such as using one or more of the message fields referenced above, in order to associate that social media message with one or more dialogs data structures in the heuristic rules and dialog database 218. For example, the text processing component 214 can look for the word "manual," in the social media message. If the word "manual" is found, the text processing component 214 may retrieve a dialog data structure from the heuristic rules and dialogs database 218 and, as the dialog data structure instructs, communicate with the customer about one or more owner's manuals, repair manuals, or other types of manuals. In another example, if the social media message includes the words, "buy", "sell", "price, "discount" or other types of words that may indicate the user or customer wishes to buy a product, the text processing component 214 can retrieve one or more dialog data structures from the heuristic rules and dialogs database 218 that can provide instruction to assist the customer in purchasing products or services from the enterprise.

Figure 3:
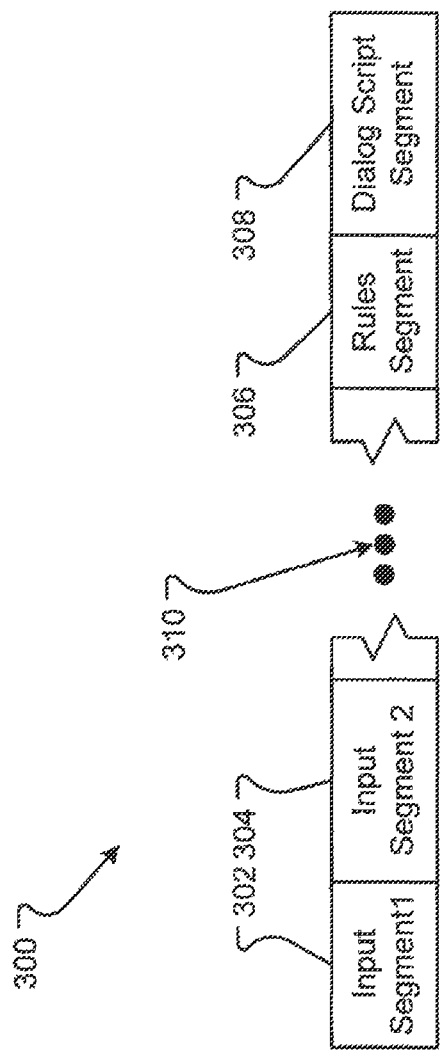
FIG. 3 illustrates an embodiment of a dialog data structure.

The analysis tools component 216 is operable to analyze response messages received back from an agent interface 224. In analyzing the agent's responses, the analysis tools component 216 can determine if the dialog data structures 300 (FIG. 3) originally retrieved by the text processing component 214 met the needs of the customer. In the analysis, the agent 228 may enter one or more items of information, for the analysis tools component 216, about the response and about how the response matched with the dialog data structures 300. The analysis tools component 216 can review the response and determine if it was similar to the response provided by the dialog data structure 300 (FIG. 3). Thus, the analysis tools component 216 can provide information to the dialog core 210 or the dialog creator 220 to improve the dialog data structures 300 (FIG. 3) that are included in the heuristic rules and dialogs database 218.

The message history database 222 can be any database or data storage system. Thus, the message history database 222 can store data in data fields, objects, or other data structures to allow other systems to retrieve that information at a later time. The message history database 222 can store previous messages or information about previous messages. Thus, for example, if the trend analysis component 212 is analyzing several messages over a period of time, the trend analysis component 212 can retrieve information about previous messages associated with the current analysis from the message history database 222. As such, the trend analysis component 212 can better detect trends occurring at the social media networks 110-a. The data stored by the message history database 222 can include the entire message or only a portion of the message, and in some circumstances, include metadata about the message(s).

The heuristic rules and dialogs database 218 can be any type of database or data storage system. The heuristic rules and dialogs database 218 can store information in data fields, data objects, and/or any other data structures. An example of information stored within the heuristic rules and dialogs database 218 is described in conjunction with FIG. 3. The heuristic rules and dialogs database 218 stores rules and dialogs data structures that automate responses to received social media messages. The dialogs data structures control the interaction between the dialog core 210 and the social media networks 110-a. The dialogs or heuristic rules can be created by a dialog creator 220. Thus, the dialog creator 220 can interface with user input 226 to receive information about dialogs. The user input 226 is then used to form the states and responses for a dialog data structure.

An agent interface 224 is a communication system operable to send action items to contact center agents 228, in the contact center. An agent can be a person or other system that is operable to respond to certain questions or requests from a customer. For example, the agent 228 can be a person that has specialized expertise in a topic area, such as technical support. The agent interface 224 can format the social message into an action item and forward that message to one or more agents 228. The agent interface 224 can also receive response(s) back from the agents 228. The information provided by the agent 228 may be used by the dialog core 210 to complete a response to the social media message. For example, the information may classify the social media message (e.g., sales, service, etc.). In other embodiments, the response is a complete response to the social media message that can be posted to the social media networks 110-a.

FIG. 3 illustrates an embodiment of a dialog data structure 300 for the IVR system 100.

The dialog data structure 300 can be stored in several different forms of databases, such as relational databases, flat files, object-oriented databases, etc. Thus, while the term "data field" or "segment" is used herein, the data may be stored in an object, an attribute of an object, or some other form of data structure. Further, the dialog data structure 300 can be stored, retrieved, sent, or received during the processing of dialogs by the dialog core 210 or the dialog creator 220. The dialog data structure 300 stores one or more items of information in one or more segments. The numeric identifiers (e.g. 302, 304, etc.) shown in FIG. 3 can identify the one or more segments.

The dialog data structure 300 can include one or more input segments, such as, input segment 1 302 and input segment 2 304, a rules segment 306, and/or a dialog script segment 308. Input segments 302 and 304 each include one or more inputs that may be required to associate a social media message with the dialog data structure 300. The inputs segments 302 and 304 may include a customer identity, a respective customer type, a text word, a phrase, or other information that indicates that the dialog data structure 300 is associated with or pertaining to the social media messages.

The input segments 302 and 304 may also include certain trends that the trend analysis component 212 can identify. As such, if a trend is identified and associated with the inputs 302 and/or 304, the dialog data structure 300 can be retrieved and used by the dialog core 210. While there are only two input segments 302 and 304 shown in FIG. 3, there may be more or fewer input segments associated with the dialog data structure 300, as indicated by ellipses 310.

The rules segment 306 can include one or more heuristic rules that either help with the association of the respective dialog data structure 300 with the social media message or control the interaction between the dialog core 210 and the social media customer. For example, the rule 306 can state that the dialog data structure 300 applies only if the social media message includes input segment 1 302 but not input segment 2 304. One skilled in the art will be able to identify other types of rules that may govern the association of the dialog data structure 300 with the social media message. In other embodiments, the rules segment 306 states that if the social media message includes inputs 302 and/or 304, then the dialog core 210 should respond with a certain type of action.

Generally, a dialog script segment 308 includes a script of actions or responses that direct one or more other components, such as the dialog core 210 (FIG. 2B), to conduct actions or send the responses. The dialog script segment 308 can include the one or more states and corresponding responses or actions required by the dialog core 210. If the dialog script segment 308 applies (that is, if the social media message is requesting a certain type of information), the dialog script segment 308 may include the one or more responses that the dialog core 210 should communicate to respond to that social media message. The dialog script segment 308 can also include a response and a pointer to another dialog script segment 308 or another dialog data structure 300. Further, the dialog script segment 308 may have one or more actions that may be taken by another component after a secondary response is received by a customer. Thus, the dialog script segment 308 can direct or instruct an interaction to continue with a social media user over a period of time and over several interactions between the user and the contact center.

It should be noted that the dialog script segment 308 can reference one or more other dialog data structures 300. Thus, the dialog script segment 308 can direct the dialog core 210 to reference at least one other dialog data structure 300 to further act on the social media message. Further, the social media message can be subject of two or more dialog script segments 308, and direct the dialog core 210 to complete two dialog script segments 308 on the social media message. Also, dialog script segments 308 may not be associated with a response but direct the dialog core 210 to complete other actions, such as populating databases or gathering information. A Social Media Manager ("SMM") dialog engine and associated dialog scripts/programs may play a role in identification of a trend and in modifications to ASR grammars used by the dialog engine for the IVR and/or ASR systems, along with associated dialog scripts/programs. The SMM dialog script/application may receive an indication that a new trend has been identified or an old trend retired. The SMM dialog engine may then extract vocabulary associated with the new trend or old trend, with assistance of the text analysis engine, and request an update to the IVR dialog script/application and/or ASR engine to include or remove the vocabulary identified with the trend. In another embodiment, the SMM dialog may post the information and context to a separate module that would determine the proper insertion or removal of the identified vocabulary.

FIG. 4 illustrates one embodiment of a logic flow 400. The logic flow 400 may be representative of some or all of the operations executed by one or more embodiments described herein.

In the illustrated embodiment shown in FIG. 4, the logic flow 400 may receive social media information 115 from one or more social media networks 110-a at block 402. Receiving social media information 115 may comprise fetching social media information 115 from the social media networks 110-a. For example, all new information may be fetched from the social media networks 110-a since the most recent fetch. Alternatively, a search may be performed on the social media networks 110-a for keywords, phrases, and other text related to the area of interest of IVR system 100.

The logic flow 400 may data mine the social media information 115 to extract one or more characteristics at block 404. The characteristics may comprise trends, new topics, sentimental spikes, and any other relevant characteristics. The characteristics may be determined according to an area of interest for the IVR system 100.

The logic flow 400 may infer a trend from the extracted one or more characteristics at block 406. A trend may indicate a change in the social media response to a particular topic, the social media attention paid to a particular topic, or the emergence of a new topic within social media. A trend may generally indicate that a topic is increasing in importance. A topic increasing in importance may correspond to the topic being more important for a business related to the contact center, being more important to customers of a business related to the contact center, or otherwise increasing the amount of interest the contact center is predicted to receive in relation to the topic.

The logic flow 400 may adjust an interactive voice response (IVR) tree 165 based upon the inferred trend at block 408.

Adjusting the IVR tree 165 may comprise moving a first option of the plurality of options from a later spot to an earlier spot in the IVR tree 165 based upon the inferred trend indicating an increased importance of a topic related to the first option. Alternatively, adjusting the IVR tree 165 may comprise creating a new option in the plurality of options based upon the inferred trend indicating an increased importance of a topic related to the new option. Where a new option is created, the logic flow 400 may further comprise creating a new queue in a contact center for the new option. Alternatively, adjusting the IVR tree 165 may comprise alerting a maintainer of the IVR tree 165 of an increased importance of a topic, receiving a new option for the plurality of options from the maintainer of the IVR tree 165, and inserting the new option into the plurality of options.

In some embodiments, the adjustment to the IVR tree 165 may have a limited duration. The logic flow 400 may therefore further comprise estimating a persistence of the inferred trend and determining the limited duration of the adjustment to the IVR tree based on the estimated persistence.

In some embodiments, the logic flow 400 may further comprise receiving an incoming call from a user and performing the adjusted IVR tree 165 for the user.

In some embodiments, the logic flow 400 may further receive additional social media information from the one or more social media networks 110-a. Data mine the additional social media information to extract one or more additional characteristics, infer a second trend from the extracted one or more additional characteristics, and return the first option of the plurality of options to the later spot based upon the inferred second trend indicating a decreased importance of the topic related to the first option.

The embodiments are not limited to this example.

Figure 5:
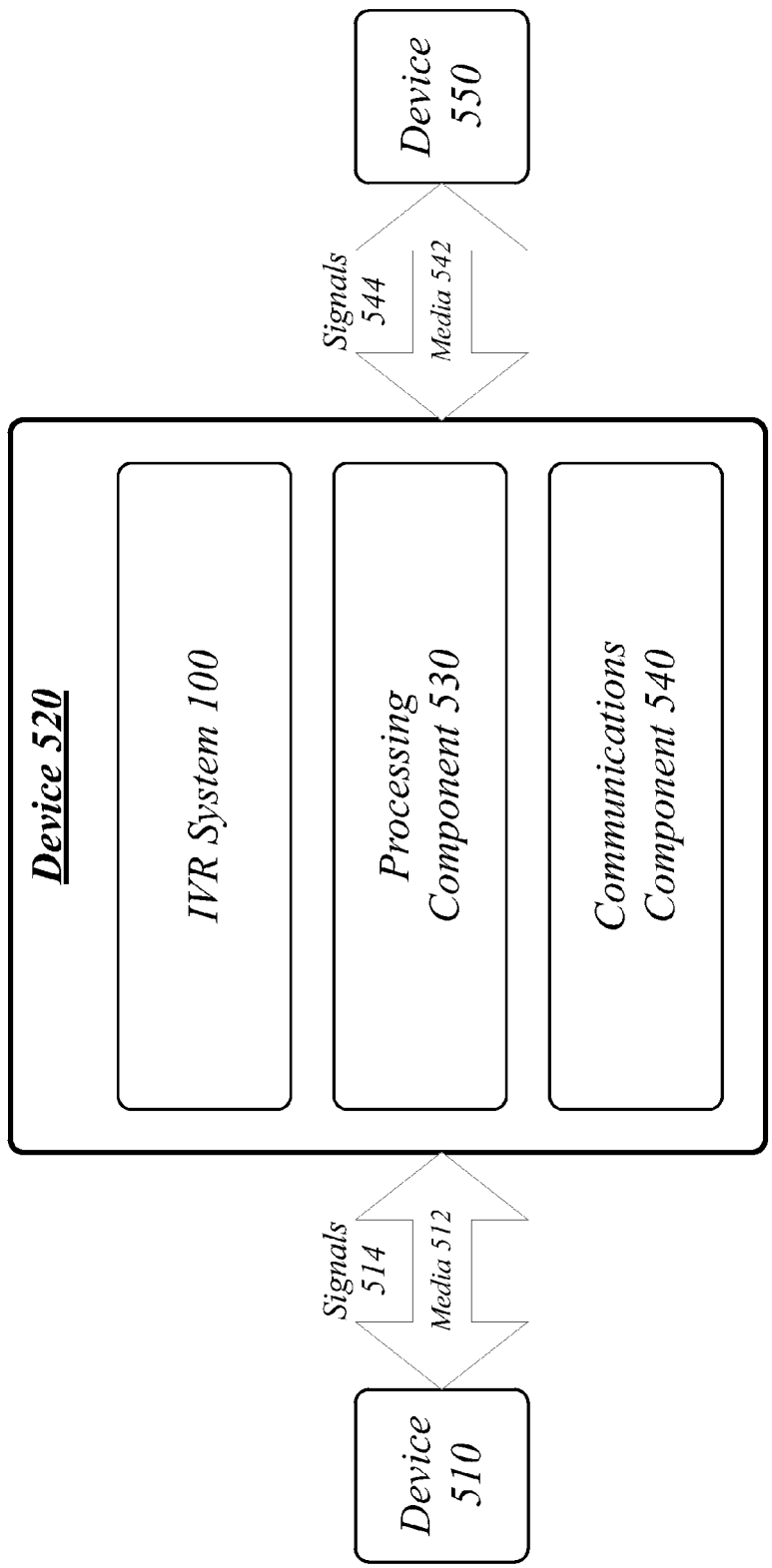
FIG. 5 illustrates an embodiment of a centralized system for the system of FIG. 1.

FIG. 5 illustrates a block diagram of a centralized system 500. The centralized system 500 may implement some or all of the structure and/or operations for the IVR system 100 in a single computing entity, such as entirely within a single device 520.

The device 520 may comprise any electronic device capable of receiving, processing, and sending information for the IVR system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 520 may execute processing operations or logic for the IVR system 100 using a processing component 530. The processing component 530 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 520 may execute communications operations or logic for the IVR system 100 using communications component 540. The communications component 540 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 540 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 58, 542 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 520 may communicate with other devices 510, 550 over a communications media 58, 542, respectively, using communications signals 514, 544, respectively, via the communications component 540. The devices 510, 550 may be internal or external to the device 520 as desired for a given implementation. For example, device 810 may comprise social media network 110-1 such that signals 514 sent over media 58 may comprise social media information 115 or a portion of social media information 115 retrieved from social media network 110-1. Device 550 may comprise a caller 180 communicating with the IVR performance component 170 for the performance of the IVR tree 165 via a voice call, such that signals 544 sent over media 542 comprises the voice call. Media 542 may therefore correspond to the Internet such that signals 544 comprise a Voice over IP (VoIP) transaction. Alternatively, media 542 may correspond to a telephone network, such as a Plain Old Telephone Service (POTS) telephone network. It will be appreciated that a voice call between a device 550 and IVR system 100 may be performed using any known technique for voice communication.

Figure 6:
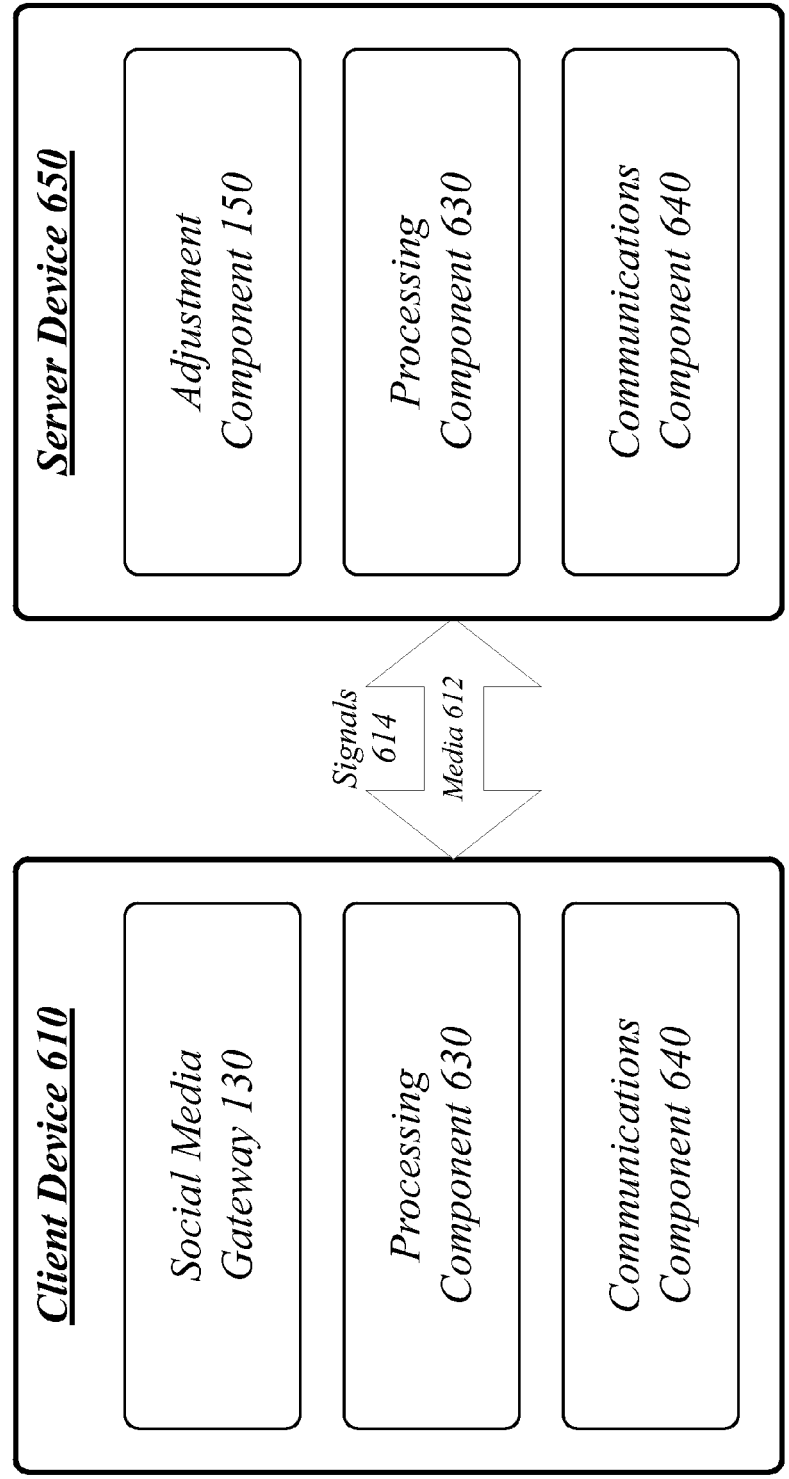
FIG. 6 illustrates an embodiment of a distributed system for the system of FIG. 1.

FIG. 6 illustrates a block diagram of a distributed system 600. The distributed system 600 may distribute portions of the structure and/or operations for the IVR system 100 across multiple computing entities. Examples of distributed system 600 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 600 may comprise a client device 610 and a server device 650. In general, the client device 610 and the server device 650 may be the same or similar to the client device 520 as described with reference to FIG. 5. For instance, the client system 610 and the server system 650 may each comprise a processing component 630 and a communications component 640 which are the same or similar to the processing component 530 and the communications component 540, respectively, as described with reference to FIG. 5. In another example, the devices 610, 650 may communicate over a communications media 68 using communications signals 614 via the communications components 640.

The client device 610 may comprise or employ one or more client programs that operate to perform various methodologies in accordance with the described embodiments. In one embodiment, for example, the client device 610 may implement the social media gateway 130. The server device 650 may comprise or employ one or more server programs that operate to perform various methodologies in accordance with the described embodiments. In one embodiment, for example, the server device 650 may implement the adjustment component 150. Signals 614 sent over media 68 may therefore comprise the transmission of the filtered social media information 135 from the social media gateway 130 to the adjustment component 150.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
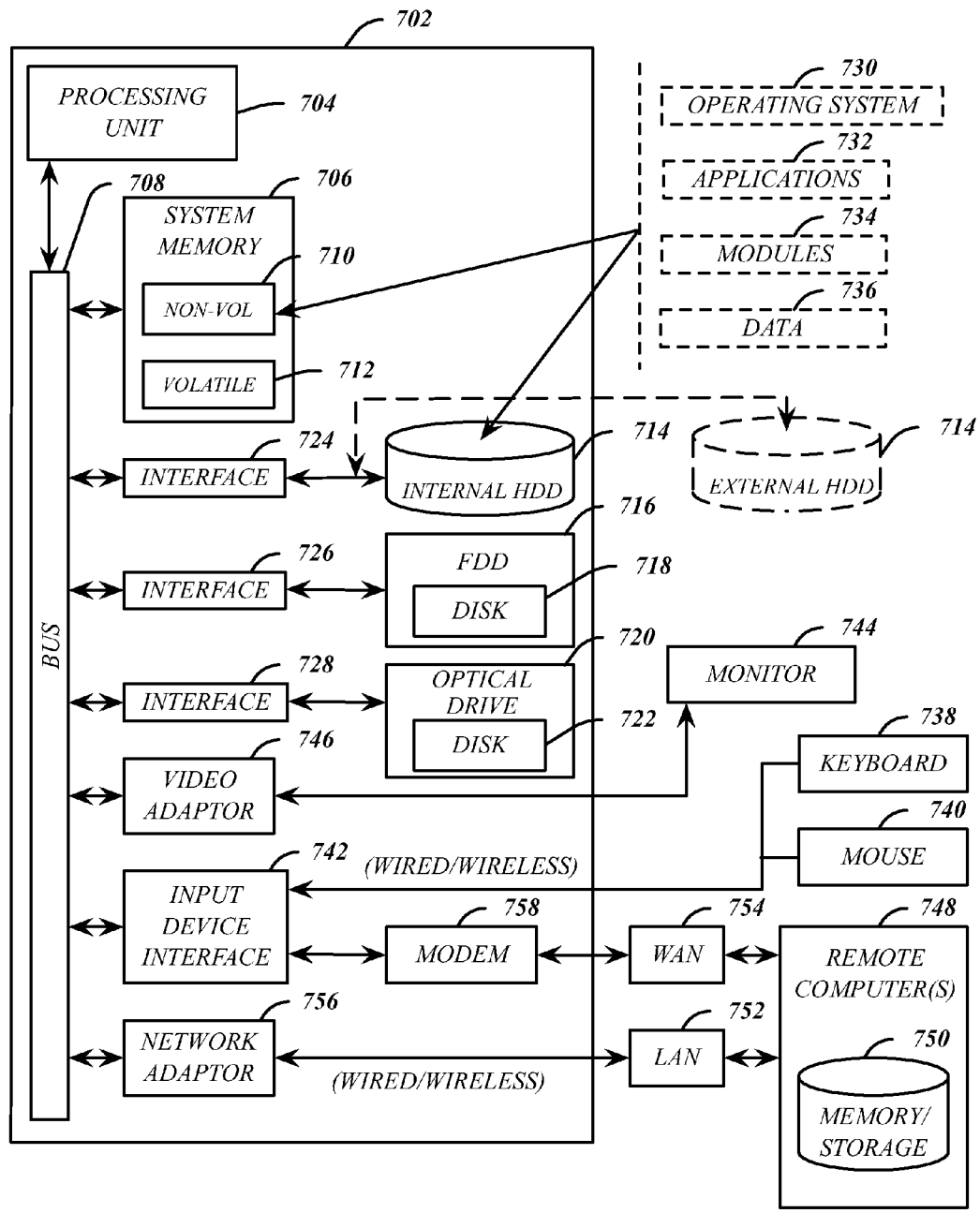
FIG. 7 illustrates an embodiment of a computing architecture.

FIG. 7 illustrates an embodiment of an exemplary computing architecture 700 suitable for implementing various embodiments as previously described. In one embodiment, the computing architecture 700 may comprise or be implemented as part of an electronic device. Examples of an electronic device may include those described with reference to FIG. 5 and FIG. 6, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 704.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 78. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 78, including an operating system 730, one or more application programs 732, other program modules 734, and program data 736. In one embodiment, the one or more application programs 732, other program modules 734, and program data 736 can include, for example, the various applications and/or components of the IVR system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.7 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.7x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
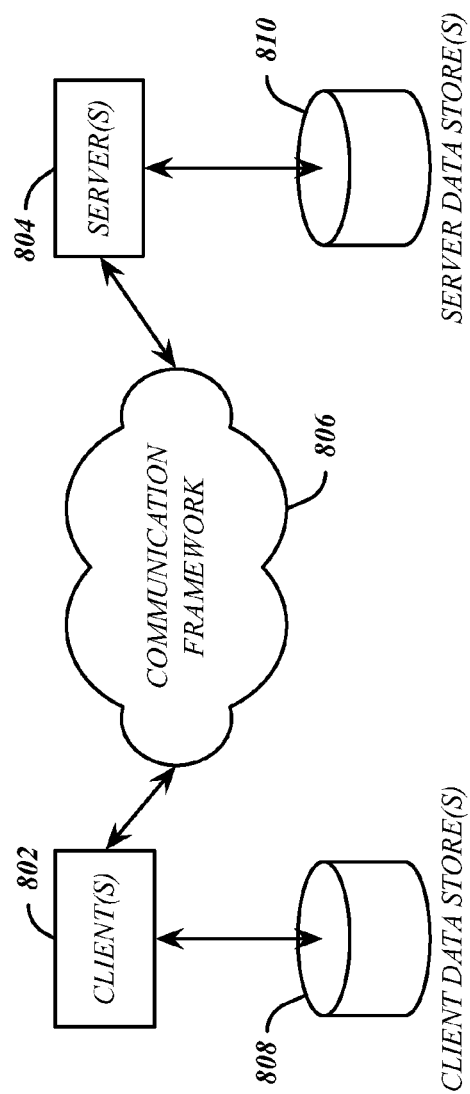
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 comprises includes one or more clients 802 and servers 804. The clients 802 may implement the client device 610. The servers 804 may implement the server device 650. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques and protocols. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 806 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
data mining, by a processor, social media information from at least one social media network, to extract a characteristic;
inferring, by the processor, a trend from the extracted characteristic;
estimating, by the processor, a persistence of the trend, wherein adjusting the customer service menu tree comprises: creating a new option in the plurality of options based upon the inferred trend indicating an increased importance of a topic related to the new option; and
adjusting, by the processor, an interactive customer service menu tree based upon the inferred trend and the persistence of the trend.

2. The method of claim 1, wherein:
the customer service menu tree comprises a plurality of options; and
adjusting the customer service menu tree comprises:
moving a first option of the plurality of options from a later spot to an earlier spot in the customer service menu tree based upon the inferred trend indicating an increased importance of a topic related to the first option.

3. The method of claim 2, further comprising:
data mining additional social media information to extract at least one additional characteristic;
inferring a second trend from the extracted at least one additional characteristic; and
returning the first option of the plurality of options to the later spot based upon the inferred second trend indicating a decreased importance of the topic related to the first option.

4. The method of claim 1 further comprising:
determining a limited duration of the adjustment to the customer service menu tree based on the estimated persistence; and modifying, by the processor, the adjustment after the limited duration has elapsed.

5. The method of claim 1, wherein:
the customer service menu tree comprises a plurality of options.

6. The method of claim 5, comprising:
creating a new queue in a contact center for the new option.

7. The method of claim 1, wherein:
the customer service menu tree comprises a plurality of options; and
adjusting the customer service menu tree comprises:
  alerting a maintainer of the customer service menu tree of an increased importance of a topic;
  receiving a new option for the plurality of options from the maintainer of the customer service menu tree; and
  inserting the new option into the plurality of options.

8. The method of claim 1, further comprising:
receiving an incoming call from a user;
performing the adjusted customer service menu tree for the user, wherein the adjustment is performed based on the inference, wherein the inference is exclusive of communication between the user and an agent of a contact center.

9. The method of claim 1, wherein adjusting, by the processor, an interactive customer service menu tree based upon the inferred trend and the persistence of the trend includes:
creating, by the processor, a new option for the menu tree in response to the inferred trend; and
retaining the new option in storage for later activation.

10. The method of claim 1, wherein:
inferring, by the processor, a trend comprises:
  distinguishing a low-persistence trend associated with at least one of a transient and a low-recurring phenomenon; and
  distinguishing a high-persistence trend associated with at least one of a non-transient event, a permanent event, and a high recurring event;
estimating, by the processor, a persistence of the trend comprises:
  associating a first pre-determined duration with the low-persistence trend;
  associating a second pre-determined duration with the high-persistence trend; and
adjusting, by the processor, an interactive customer service menu tree further comprises:
  asserting the adjustment for the first pre-determined duration where the inferred trend is a low-persistence trend; and
  asserting the adjustment for the second pre-determined duration where the inferred trend is a high-persistence trend.

11. The method of claim 1, further comprising:
categorizing, by the processor, various trends where each trend has a corresponding particular expected persistence;
wherein:
inferring, by the processor, a trend further comprises:
  selecting, by the processor, a category associated with the trend; and
estimating, by the processor, a persistence of the trend comprises:
  selecting the particular expected persistence associated with the selected category.

12. The method of claim 1, further comprising:
reverting, by the processor, the interactive customer service menu tree back to its configuration just prior to the adjustment, after the inferred trend has subsided below a predetermined threshold.

13. An apparatus, comprising:
a processor circuit on a device having a processor coupled to memory, wherein the processor executes program code stored in the memory to;
  implement a social media gateway that receives social media information from at least one social media network; and
  extract from the social media information, a characteristic;
  infer a trend from the extracted characteristic;
  estimate a persistence of the trend, and
  adjust a customer service menu tree based upon the inferred trend and the persistence of the trend, wherein the processor executes further program code stored in the memory to adjust the customer service menu tree by creating a new option in the plurality of options based upon the inferred trend indicating an increased importance of a topic related to the new option.

14. The apparatus of claim 13, wherein:
the customer service menu tree comprises a plurality of options; and
the processor executes further program code stored in the memory to:
  move a first option of the plurality of options from a later spot to an earlier spot in the customer service menu tree based upon the inferred trend indicating an increased importance of a topic related to the first option.

15. The apparatus of claim 14, wherein:
the processor executes further program code stored in the memory to implement the social media gateway so as to receive additional social media information from at least one social media network; and
the processor executes further program code stored in the memory to data mine the additional social media information to:
  extract at least one additional characteristic;
  infer a second trend from the extracted at least one additional characteristic; and
  return the first option of the plurality of options to the later spot based upon the inferred second trend indicating a decreased importance of the topic related to the first option.

16. The apparatus of claim 13, wherein the processor executes further program code stored in the memory to:
determine a limited duration of the adjustment to the customer service menu tree based on the estimated persistence; and
remove the adjustment after the limited adjustment has lapsed.

17. The apparatus of claim 13, wherein:
the customer service menu tree comprises a plurality of options.

18. The apparatus of claim 13, wherein:
the customer service menu tree comprises a plurality of options; and
the processor executes further program code stored in the memory to adjust the customer service menu tree by alerting a maintainer of the customer service menu tree of an increased importance of a topic, receiving a new option for the plurality of options from the maintainer of the customer service menu tree, and inserting the new option into the plurality of options.

19. The system of claim 13, wherein:
the processor executes further program code stored in the memory to infer a trend by:
  distinguishing a low-persistence trend associated with at least one of a transient and a low-recurring phenomenon; and
  distinguishing a high-persistence trend associated with at least one of a non-transient event, a permanent event, and a high recurring event;
the processor executes further program code stored in the memory to estimate a persistence of the trend by:
  associating a first pre-determined duration with the low-persistence trend;
  associating a second pre-determined duration with the high-persistence trend;
the processor executes further program code stored in the memory to adjust an interactive customer service menu tree further by:
  asserting the adjustment for the first pre-determined duration where the inferred trend is a low-persistence trend; and
  asserting the adjustment for the second pre-determined duration where the inferred trend is a high-persistence trend; and
the processor executes further program code stored in the memory to revert the interactive customer service menu tree back to its configuration just prior to the adjustment, after the inferred trend has subsided below a predetermined threshold.

20. The system of claim 13, wherein:
the processor executes further program code stored in the memory to categorize various trends where each trend has a corresponding particular expected persistence;
the processor executes further program code stored in the memory to infer a trend by:
  selecting, by the processor, a category associated with the trend; and
the processor executes further program code stored in the memory to estimate a persistence of the trend by:
  selecting the particular expected persistence associated with the selected category.

* * * * *